United States Patent
Carr

(10) Patent No.: US 6,202,338 B1
(45) Date of Patent: Mar. 20, 2001

(54) CRANK BAIT FISHING LURE

(76) Inventor: Gerald Kenneth Carr, 505-8th St. S., Cranbrook, B.C. (CA), V1C 1P3

(*) Notice: Subject to any disclaimer, the term of this patent is extended or adjusted under 35 U.S.C. 154(b) by 0 days.

(21) Appl. No.: 08/991,405

(22) Filed: Dec. 16, 1997

(30) Foreign Application Priority Data

Dec. 20, 1996 (CA) .................................................. 2193265
Jan. 30, 1997 (CA) .................................................. 1997-0185

(51) Int. Cl.[7] .................................................. A01K 85/00
(52) U.S. Cl. ........................ 43/42.5; 43/42.34; 43/42.32
(58) Field of Search .............................. 43/42.32, 42.33, 43/42.34, 42.35, 42.5, 42.51, 42.52

(56) References Cited

U.S. PATENT DOCUMENTS

| | | | |
|---|---|---|---|
| 1,179,964 | * 4/1916 | Robertson | 43/42.34 |
| 1,463,858 | * 8/1923 | Wandve | 43/42.34 |
| 1,846,130 | * 2/1932 | Martin | 43/42.34 |
| 3,021,636 | * 2/1962 | Gowdy | 43/42.34 |
| 3,305,964 | * 2/1967 | Wieszeck | 43/42.32 |
| 3,919,802 | * 11/1975 | Davis | 43/42.34 |
| 4,122,624 | * 10/1978 | Smith | 43/42.33 |
| 4,479,323 | * 10/1984 | Burr | 43/42.33 |
| 5,647,163 | * 7/1997 | Gorney | 43/42.32 |

\* cited by examiner

*Primary Examiner*—Peter M. Poon
*Assistant Examiner*—Elizabeth Shaw

(57) ABSTRACT

A Crank Bait Fishing Lure that has a predictable wobble or action. A fishing lure made from a blank of rigid material and formed to provide a predictable wobble or action in an arch or approximately 180°, having a front end and a tail end. The front end has an eylet to which a line is attached, and the tail end has an eyelet to which a hook is attached. A lure, with appendages, which is shaped to have a center of gravity that causes a wobble from left to right and from right to left, while maintaining a horizontal attitude when drawn or dropped through water, thus allowing a lure to maintain an upright attitude. The transverse bend which characterizes this shape is placed nearer the front of the lure and it's depth is approximately one third of the overall length of the lure. The degree of bend to the front end of a lure will effect the depth at which a lure will travel as it is drawn through water. Change in the elevation or plane at the tail end will alter the wobble or action slightly. A lure will maintain it's predictable motion when drawn through or dropped through water at a broad range of speeds.

1 Claim, 2 Drawing Sheets

CRANK BAIT FISHING LURE

BACKGROUND OF INVENTION

This invention relates to Crank Bait Fishing Lures used by fishermen for trolling, casting or jigging. It is common in Crank Bait Lures that the motion is spinning and is not usually effective in all phases of fishing. This Crank Bait Lure is similar to the fishing lure, patented by J. H. Martin, U.S. Pat. No. 1,846,130, patented Feb. 23, 1932. In terms of the basic body action, both oscillate side to side without revolving. Unlike Martin, our invention is designed to produce this oscillating action at a broad spectrum of speeds enabling it to be used for trolling, casting and jigging. This invention is also uniquely designed to produce a rhythmic side to side motion of the hook. Other lures tend to produce an erratic action which results in a lot of unsuccessful strikes.

DESCRIPTION OF PRIOR ART

The U.S. Pat. No. 1,846,130—43/42.34 fishing lure describes a concavo-convex main body with a plurality of transverse ridges, having a reflective body with an eyelet at the front to which a line is attached and an eyelet at the back to which a hook is attached.

The Martin design has a number of shortcomings, including the statement that, "When towed at the proper speed, will rock from side to side." This design also makes no mention of how the body motion and shape affects the motion of the hook, which is a critical component of successful strikes.

In addition, the V-shape of Martin's lure runs longitudinally in the body of the lure whereas in our invention the bend runs transversely in the body of the lure producing a slower and more exaggerated rocking action.

SUMMARY OF THE INVENTION

This invention is made up of a piece of metal formed into a rigid, relatively flat, elongated body. This body has a bend resembling a half circle located nearer to the front of the body with a depth of approximately one third the overall length of the lure. Both ends of the lure are elliptical and have eyelets in them. The line is attached to the front eyelet and the hook to the rear eyelet.

The size, location and singularity of the bend causes a slow, gentle oscillating motion of the lure body and the hook at a broad spectrum of retrieval speeds. This addresses, somewhat, problems associated with other Crank Bait Fishing Lures.

Other Crank Bait Fishing Lures tend to have erratic action of the lure body and hook. And some, which have oscillating action similar to our design, are restricted to a specific speed, and make no mention of the action or movement of the hook which is critical in two ways.

First, the side to side action of the hook resembles a minnow's tail, especially if the hook is dressed with feathers. Second, the consistent, predictable side to side motion is an easier target for the fish to strike.

As our lure moves from side to side light is reflected by the concave portion of the bend, this serves to further attract the fish.

BRIEF DESCRIPTION OF THE DRAWINGS

In drawings that illustrate embodiments of the invention.

Figure 1:
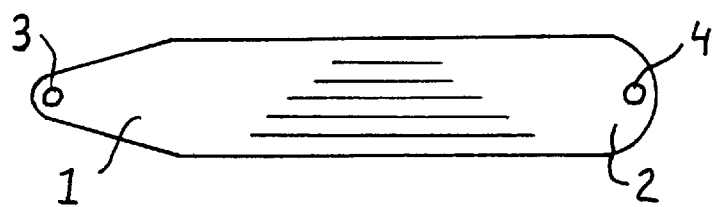
FIG. 1 is a top view of a blank from which the body of the lure is formed.
Figure 2:
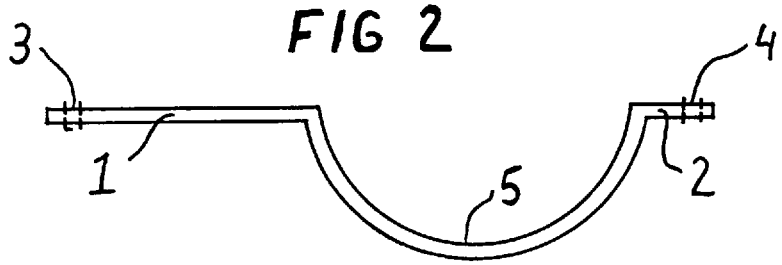
FIG. 2 is a side view of the invention.
Figure 3:
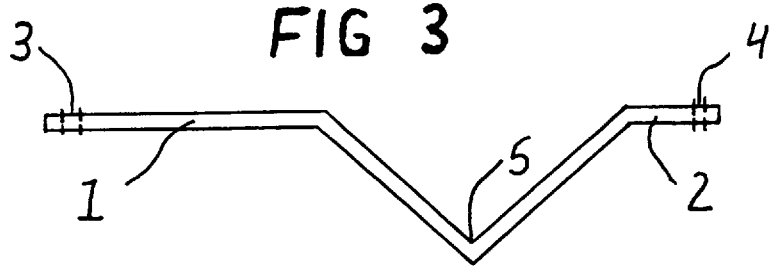
FIG. 3 is a side view of an alternative embodiment.
Figure 4:
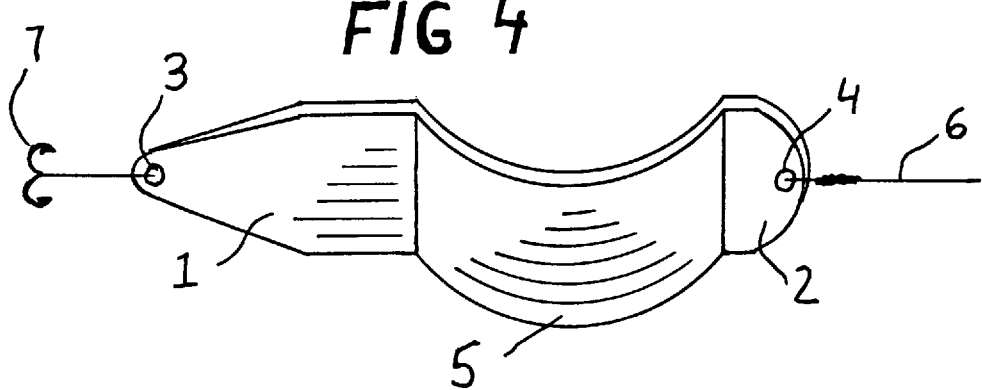
FIG. 4 is a perspective view of FIG. 2.
Figure 5:
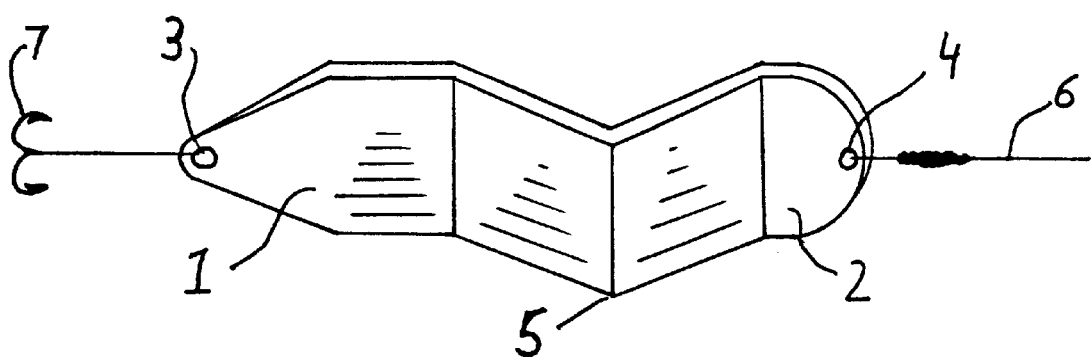
FIG. 5 is a perspective view of FIG. 3.
Figure 6:
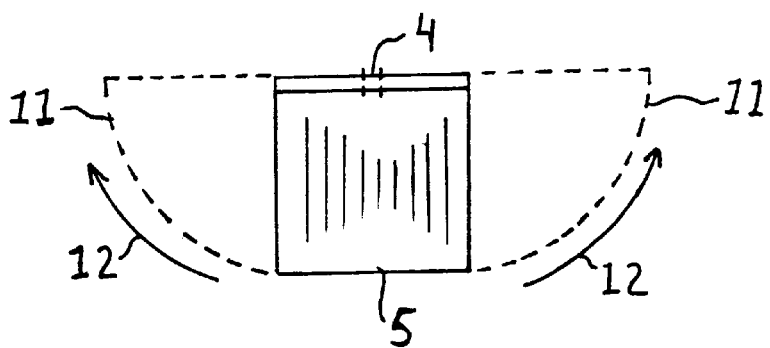
FIG. 6 is a frontal view of the invention in operation.

A Crank Bait Fishing Lure which has a predictable wobble action.

DETAILED DESCRIPTION OF DRAWINGS

A fishing lure made from a blank or rigid material and formed to provide a predictable wobble or action in an arch of approximately 180°, having a body (A), a front end (2) and a tail end (1). The front end (2) has an eyelet (4) to which a line (6) is attached, and a tail end (1) with an eyelet (3) to which a hook (7) is attached. The body (A) of which is shaped to have a centre of gravity (5) that causes a lure to wobble from left to right (11) and (12) and from right to left (11) and (12), while maintaining a horizontal attitude when drawn through or dropped through water allowing a lure to maintain an upright attitude. The transverse bend (5) which characterizes this shape is placed nearer to the front of the lure and it's depth is approximately one third of the overall length of the lure. The degree of the bend to the front end (2) of a lure will effect the depth at which a lure will travel as it is drawn through the water. The change in elevation or plane at the tail end (1) of a lure will change the wobble of action slightly. A lure will maintain it's predictable motion when drawn through or dropped through water.

What is claimed is:

1. A crank bait lure for catching fish, as shown and described, whether trolling, casting, or jigging, comprising a single relatively flat elongated strip of reflective, rigid material for the body with no appendages, with an eyelet at the front end to which a line has been attached, and an eyelet in the tail end to which a hook has been attached, with a transverse half-circle depression which spans the width of the elongated strip substantially completely including side edges of said elongated strip and located with the centre of the half-circle at the centre of gravity of said lure.

* * * * *